United States Patent Office 3,186,984
Patented June 1, 1965

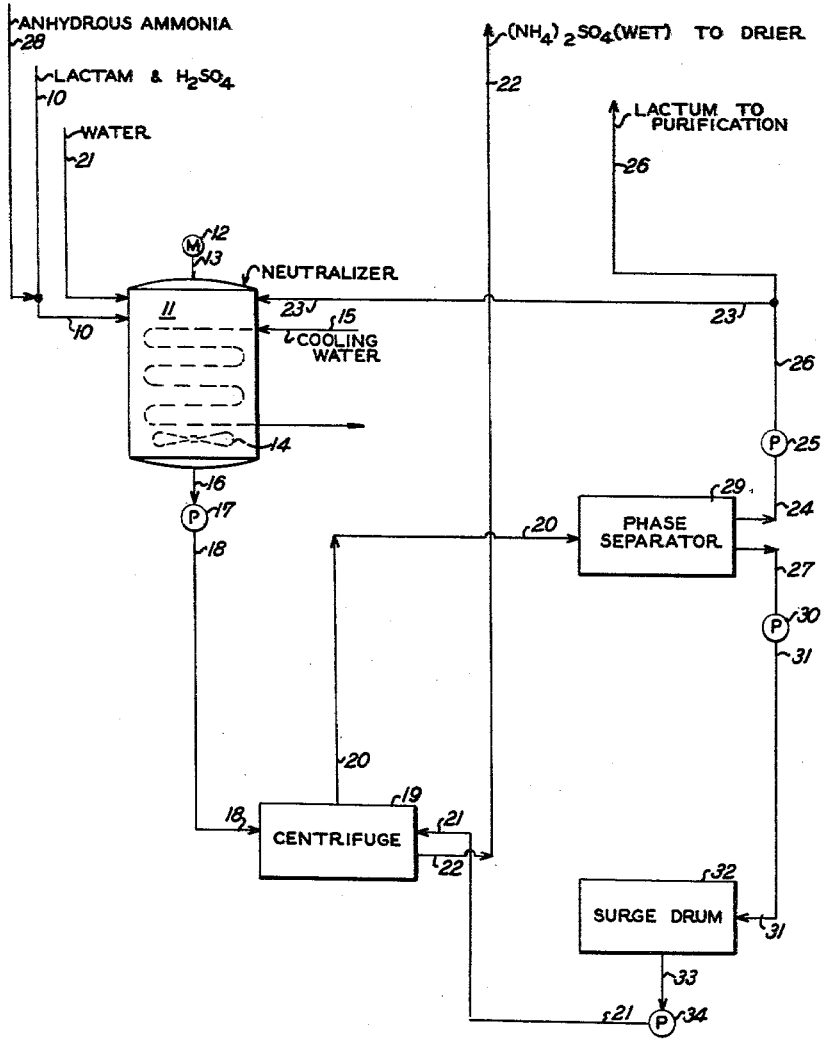

3,186,984
RECOVERY OF LACTAMS
John White Colton, Pelham Manor, N.Y., assignor to Halcon International, Inc., a corporation of Delaware
Filed Oct. 10, 1962, Ser. No. 229,538
2 Claims. (Cl. 260—239.3)

This invention relates to processes for the recovery of a lactam from a mixture thereof with concentrated sulfuric acid, more particularly to such processes for the recovery of caprolactam from such a mixture by neutralization of the sulfuric acid with ammonia in the presence of concentrated aqueous lactam, and especially to such processes wherein concentrations are regulated so that the reaction mixture forms a solid ammonium sulfate phase, a liquid phase which is predominantly aqueous caprolactam, separating the solid and the liquid phases, washing the separated solid with concentrated aqueous ammonium sulfate liquid, mixing the liquids and separating the resulting two phases, a part of the lactam phase being recycled to the neutralization reaction step.

In a known process for the preparation of a lactam such as caprolactam, the corresponding ketoxime is rearranged in the presence of concentrated sulfuric acid at about 80° to 130° C. to give a mixture of the latter acid with the lactam. The lactam may be recovered by substantial neutralization of the reaction mixture with aqueous ammonia followed by separating an aqueous lactam phase from an aqueous ammonium sulfate phase. The latter may be evaporated or concentrated in order to recover solid ammonium sulfate; and it may be desirable to subject it to benzene extraction to recover the lactam therein. However, this is undesirable from the economic viewpoint due to the high heat costs and also the complexity of the procedure. The art is confronted by the problem of providing a more efficient process for recovering lactams.

The discoveries associated with the invention and relating to the solution of the above problems, and the objects achieved in accordance with the invention as set forth herein include the provision of:

The process for recovering a lactam from a mixture thereof with sulfuric acid which comprises treating the mixture at a temperature in the range of 20° to 60° C. with ammonia in the presence of concentrated liquid aqueous lactam, separating from the resulting mixture the solid ammonium sulfate phase, which is 20 to 35% of the weight of the total mixture, and the lactam rich liquid phase washing the solid ammonium sulfate phase with concentrated aqueous ammonium sulfate liquid, mixing the resulting liquids and separating therefrom a lactam rich liquid phase and recycling a part of this phase to the treating step to provide the desired concentration, and separating the concentrated aqueous ammonium sulfate phase;

Such a process wherein the lactam is caprolactam and water is added in the treating step to maintain the desired concentration, the neutralization mixture containing as liquids about 68% of lactam, plus 28% water and 4% solutes, the amount of solids being 43 parts per 133 parts of liquid mixture;

Such a process wherein the initial lactam is mixed with 98% sulfuric acid;

Such a process wherein the temperature is 30° to 40° C.;

Such a process wherein the initial lactam mixture contains 99% sulfuric acid;

Such a process wherein the temperature is about 50° C.;

Such a process carried out in a continuous manner;

Such a process wherein the neutralization is carried out in a series of reaction zones, arranged in sequence;

And other objects which will be apparent as details or embodiments of the invention are set forth hereinafter.

The accompanying drawing is a schematic flow diagram of a preferred embodiment of the invention.

In order to indicate still more fully the nature of the present invention the following examples of typical procedures are set forth in which parts and percents mean parts and percents by weights, respectively unless otherwise indicated, it being understood that these examples are presented as illustrative only and they are not intended to limit the scope of the invention.

*Example 1*

Referring to the drawing, anhydrous ammonia (about 1200 lbs./hr.) is introduced via line 28 into line 10 wherein it is mixed with a mixture of caprolactam (about 2600 lbs./hr.) and 98% sulfuric acid (about 3400 lbs./hr.) and the resulting mixture is passed into neutralizer 11, wherein it is reacted at atmospheric pressure and substantially neutralized with agitation at 30° to 40° C. The neutralizer is equipped with agitation means such as a motor 12, shaft 13, and agitator blades 14. Water is introduced via line 21, and lactam is recycled via line 23. The neutralizer is also provided with a cooling coil through which cooling water is passed via line 15 to maintain the desired temperature. The composition of the reaction mixture is about 68% lactam plus 4% solute in 28% of water, and about 43 parts of solid ammonium sulfate per 133 parts of liquid mixture.

The resulting reaction mixture is passed via line 16, pump 17 and line 18 to centrifuge or separator 19. The solid ammonium sulfate phase is separated therein. The solid ammonium sulfate is given a wash with recycled aqueous ammonium sulfate passed via line 21 into the centrifuge 19; then it is removed via line 22. It may be dried and marketed for use as fertilizer. In this way, specification grade sulfate is obtained directly.

An important feature of this process is operation at moderate temperature, as compared to the high temperature required to maintain a liquid mixture if anhydrous ammonia is used. Also, no ice-water is needed.

The product and wash liquids separated in the centrifuge 19 are passed via line 20 to phase separator 29 from which a lactam phase is removed via line 24, pump 25 and line 26. The (saturated) aqueous ammonium sulfate phase is removed from phase separator 29 via line 27 and pump 30 and it is passed via line 31 to surge drum 32. The liquor is passed from surge drum 32 via line 33, pump 34 and line 21 back to the centrifuge, as wash liquid. In this way, the by-product ammonium sulfate is substantially free of lactam and yet the process avoids such costly and undesirable procedures as benzene extraction. The lactam is recovered in good yield and is substantially free of ammonium sulfate; it may be purified readily in known manner.

The amount of water introduced into the reactor is substantially balanced by that removed with the salt and the lactam. The amount of lactam recycled to the reactor is such as to maintain the desired solids concentration. The liquid phase in the reactor contains from about 70 to 90% lactam, and the remainder is water. There is a single liquid phase.

An essential feature of the process is that the net input of ammonium sulfate in the system appears substantially in the solid phase, and is removed by centrifuging or equivalent separation procedures. This process avoids costly evaporation of water to form solid ammonium sulfate; also it avoids high temperature and heat transfer difficulties due to the high viscosities which would be involved therein.

*Example 2*

The above procedure is repeated, except that the feed contains about 99% acid, and the neutralization temperature is 50° C., and similar results are obtained. This temperature is desirable inasmuch as it reduces cooling costs.

Desirably, the neutralization is carried out in two or more reactors arranged in series, and in a continuous manner.

Comparable results to the foregoing are achieved with various modifications thereof, including the following. Any mixture of lactam with sulfuric acid may be processed in accordance with the invention. The ammonium sulfate forms a solid phase which is 20 to 35% of the weight of the total material present, although somewhat higher or lower concentrations are operative, but not preferred for practical operation. The liquid material is a lactam rich phase. The liquid mixture contains about 70 to 90% lactam and 30 to 10% water. It also contains a trace of ammonium sulfate. The lactams obtained from oximes of 4 to 11 carbon atoms are preferred. Examples of such lactams and the related oximes are caprolactam and cyclohexanone oxime, oenantholactam and cycloheptanone oxime, omega-aminooctylic acid lactam and cyclooctanone oxime, omega-amino-decyclic acid lactam and cyclodecanone oxime, omega-amino-undecyclic acid lactam and cycloundecanone oxime.

The feed streams and the recycle stream may be fed directly to the neutralizer, if desired. Any stream or mixture may be pre-cooled, if desired, before it enters the neutralizer. Any sequence for separation of solid and liquids may be used. The wash of the solid sulfate may be with about 1 to 10 times its weight of saturated solution, preferably about 4 to 8 times.

In view of the foregoing disclosures, variations and modifications thereof will be apparent to one skilled in the art, and it is intended to include within the invention all such variations and modifications except as do not come within the scope of the appended claims.

What is claimed is:

1. In a process for recovering a lactam from a mixture thereof with sulfuric acid wherein said mixture is treated with anhydrous ammonia in the presence of added lactam, the resulting mixture is separated into a solid ammonium sulfate phase and a lactam rich liquid phase, and lactam rich liquid is recycled to the treating step, the improvement which comprises washing said solid ammonium sulfate phase with concentrated aqueous ammonium sulfate liquid, mixing the liquid from the said washing with said lactam rich phase, separating the resulting mixture into a second lactam rich phase and a concentrated aqueous ammonium sulfate phase, recycling part of the separated second lactam rich phase to said ammonia treating step, and recycling the separated concentrated aqueous ammonium sulfate phase to the said washing step.

2. The process of claim 1 wherein the lactam is caprolactam.

References Cited by the Examiner

UNITED STATES PATENTS 2,605,261   7/52   Kahr _____ 260—239.3

FOREIGN PATENTS 667,075   2/52   Great Britain.
458,387   7/50   Italy.

IRVING MARCUS, *Primary Examiner.*

D. T. McCUTCHEN, *Examiner.*